United States Patent
Sethi et al.

(10) Patent No.: US 11,327,545 B2
(45) Date of Patent: May 10, 2022

(54) AUTOMATED MANAGEMENT OF POWER DISTRIBUTION DURING A POWER CRISIS

(71) Applicant: Dell Products L.P., Round Rock, TX (US)

(72) Inventors: Parminder Singh Sethi, Ludhiana (IN); Suren Kumar, Katpadi (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/906,409

(22) Filed: Jun. 19, 2020

(65) Prior Publication Data

US 2021/0397239 A1 Dec. 23, 2021

(51) Int. Cl.
| | | |
|---|---|---|
| *G06F 1/28* | (2006.01) | |
| *G06F 1/30* | (2006.01) | |
| *G06N 20/00* | (2019.01) | |
| *G06F 1/3296* | (2019.01) | |
| *G06F 1/3287* | (2019.01) | |
| *G06F 1/3206* | (2019.01) | |

(52) U.S. Cl.
CPC ............... *G06F 1/30* (2013.01); *G06F 1/28* (2013.01); *G06F 1/3206* (2013.01); *G06F 1/3287* (2013.01); *G06F 1/3296* (2013.01); *G06N 20/00* (2019.01)

(58) Field of Classification Search
CPC . G06F 1/30; G06F 1/28; G06F 1/3206; G06F 1/3287; G06F 1/3296; G06N 20/00
See application file for complete search history.

(56) References Cited

U.S. PATENT DOCUMENTS

| | | | | |
|---|---|---|---|---|
| 2009/0055665 | A1* | 2/2009 | Maglione | G06F 1/3203 713/320 |
| 2010/0235654 | A1* | 9/2010 | Malik | G06F 1/26 713/300 |
| 2013/0318371 | A1* | 11/2013 | Hormuth | G06F 1/28 713/320 |
| 2015/0121113 | A1* | 4/2015 | Ramamurthy | H02J 7/00712 713/340 |

OTHER PUBLICATIONS

Wikipedia, "Server (computing)," https://en.wikipedia.org/w/index.php?title=Server_(computing)&oldid=961609967, Jun. 9, 2020, 9 pages.
Wikipedia, "Power Distribution Unit," https://en.wikipedia.org/w/index.php?title=Power_distribution_unit&oldid=950349282, Apr. 11, 2020, 2 pages.
Wikipedia, "Load (computing)," https://en.wikipedia.org/w/index.php?title=Load_(computing)&oldid=956351597, May 12, 2020, 5 pages.
Wikipedia, "Network Traffic," https://en.wikipedia.org/w/index.php?title=Network_traffic&oldid=923931631, Oct. 31, 2019, 1 page.

* cited by examiner

*Primary Examiner* — Albert Wang
(74) *Attorney, Agent, or Firm* — Ryan, Mason & Lewis, LLP

(57) ABSTRACT

A method comprises analyzing performance data of a system using one or more machine learning techniques. The system comprises a plurality of hardware components. In the method, a priority list of the plurality of hardware components is generated based on the analysis, and power from one or more power sources is distributed to one or more of the plurality of hardware components based on the priority list.

20 Claims, 11 Drawing Sheets

| Server Priority List | Service Tag | Application/Service Provided By Server | | | Utilization | | |
|---|---|---|---|---|---|---|---|
| | | Application 1 | Application 2 | Application 3 | CPU | Memory | Power |
| 1 | ADB1233 | SQL Database | Web Service | Backup Agent Service | 80% | 60% | 70% |
| 2 | GDS3452 | Banking Software | Web Service | Backup Agent Service | 40% | 50% | 50% |
| 3 | SDFF4456 | SQL IMDB | Backup Agent Service | | 30% | 50% | 55% |
| 4 | NNSDF23 | Big data analytics | Backup Agent Service | | 86% | 70% | 90% |
| 5 | VAS12563 | SQL IMDB | File service | Backup Agent Service | 60% | 80% | 60% |
| 6 | SDF4563Q | HPCG | | | 40% | 50% | 50% |
| 7 | QWE6793 | ScaleIO | Backup Agent Service | | 80% | 60% | 70% |
| 8 | LHJK2341 | Backup Server Service | | | 40% | 50% | 50% |

```
Process
{
    "ProcessName" + " " + "Priority" > ProcsAndPrios.txt
    #foreach ($c in $ComputerName) {
        $c = "Host"
        Write-Verbose -Message "checking $c"
        $result = tasklist /v /s "$c"
        if (!$?){
            # Better error handling can happen here.
            Write-Warning 'Tasklist failed.'
            throw
        }
        Write-Warning 'Tasklist Passed.'
        # Parsing the formatting based on the tasklist output
        $format = $result[2] | ConvertFrom-String | measure -Property * -Character | select property, characters foreach ($r in $result){
            if ($r.length -eq 0){
                Write-Verbose 'Hitting a blank line'
                continue
            }
            if ($r -match '^(===)+' -or $r -match '^Image\sName\s+PID'){
                Write-Verbose 'Hitting the headers'
                continue
            }
            else{
                Write-Verbose -Message "checking $r"
                [int]$StringPosition = 0
                [int]$FieldCount = 0
```

500

```
600

ComputerName : WIN-7IDL09S0UDS
ImageName    : System Idle Process
PID          : 0
Session#     : 0
MemUsage     : 8 K
Status       : Unknown
UserName     : NT AUTHORITY\SYSTEM
CPUTime      : 8722:07:49

ComputerName : WIN-7IDL09S0UDS
ImageName    : System
PID          : 4
Session#     : 0
MemUsage     : 148 K
Status       : Unknown
UserName     : N/A
CPUTime      : 0:02:27

ComputerName : WIN-7IDL09S0UDS
ImageName    : Registry
PID          : 560
Session#     : 0
MemUsage     : 66,544 K
Status       : Unknown
UserName     : NT AUTHORITY\SYSTEM
CPUTime      : 0:00:02
```

FIG. 6

AUTOMATED MANAGEMENT OF POWER DISTRIBUTION DURING A POWER CRISIS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to prioritization and management of power distribution for components in information processing systems.

BACKGROUND

In datacenters, power monitoring and management is performed via a centralized management console. The management console provides an administrator with input power and power usage details of the datacenter. In addition, administrators are able to access and view historical power usage data of a datacenter via the management console.

Some power monitoring and management systems have an automatic shutdown option to schedule when the servers and/or other equipment can be powered off and on to efficiently manage power usage. For example, for servers which are not going to be used during holiday periods and on weekends, an administrator can create a group of the servers and apply a power policy to schedule powering off and on for the group of servers during the holiday periods and on weekends. A power crisis and/or outage may occur due to, for example, accidents, problems with distribution from power sources and/or natural disasters. In conventional systems, when there is a power crisis and/or outage, administrators are required to manually analyze servers to identify which servers should be given relatively higher priority for power consumption and to input this information to a management console. The need for manual intervention to prioritize servers and manage power distribution during a power outage is problematic, and can cause catastrophic results if essential servers or other equipment are not running for extended periods.

SUMMARY

Illustrative embodiments provide techniques for automated prioritization and management of power distribution to servers and other equipment during power outages and shortages.

In one embodiment, a method comprises analyzing performance data of a system using one or more machine learning techniques. The system comprises a plurality of hardware components. In the method, a priority list of the plurality of hardware components is generated based on the analysis, and power from one or more power sources is distributed to one or more of the plurality of hardware components based on the priority list.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts a table including details of a server priority list according to an illustrative embodiment.

FIG. 5 depicts example pseudocode for data collection according to an illustrative embodiment.

FIG. 6 depicts an example listing of collected data corresponding to services and/or applications running on computers in a datacenter in an illustrative embodiment.

DETAILED DESCRIPTION

Figure 1:
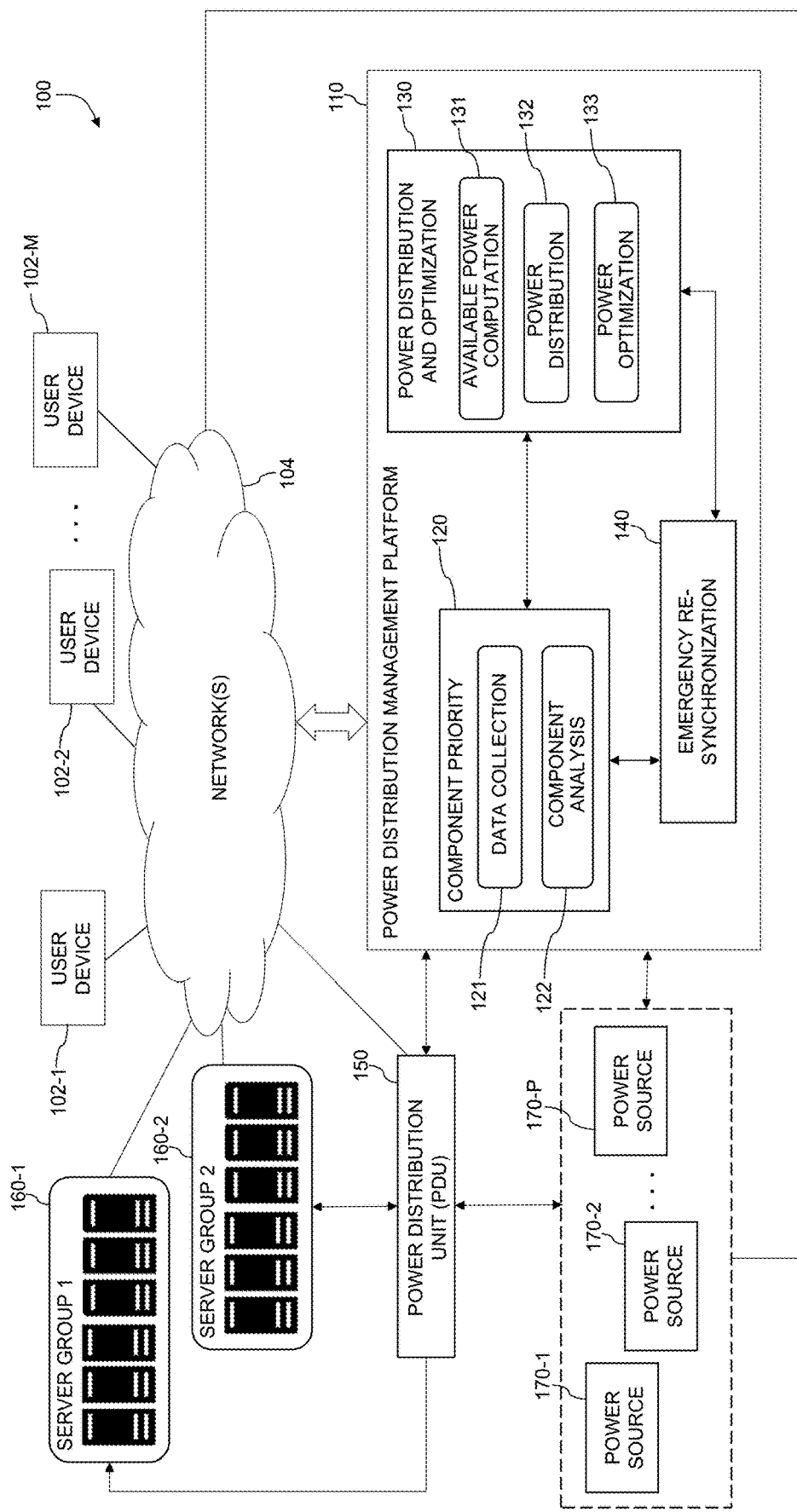
FIG. 1 depicts details of an information processing system with a power distribution management platform for prioritizing and managing power distribution according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "server" refers to a device configured to provide functionality (e.g., applications, tasks and services) for programs or devices, which can be referred to as "users" or "clients." Servers provide various functionalities for clients or users, including, but not necessarily limited to, hosting web pages, cataloging network data, storing data, implementing communications, performing computations, sharing files, processing electronic mail, providing gaming services, providing streaming services and providing virtualization services.

In an illustrative embodiment, machine learning techniques are used to intelligently prioritize and manage the power distribution to hardware components during power outages or shortages without human intervention. The hardware components include, but are not necessarily limited to, servers or other equipment. The embodiments provide functionality for a management console which will manage power efficiently based on component priority during a loss of or decrease in power supply. In one or more embodiments, available power will be supplied to system components based on priority, and power usage optimization will be performed to supply the power to as many components as possible.

According to an embodiment, machine learning techniques are used to prioritize servers and/or other components in a datacenter by analyzing, for example, applications installed on the servers, system load, system traffic and system health information. A recommended component priority list for a datacenter is transmitted to a datacenter administrator, who will have authority to apply or modify the recommendations.

The embodiments utilize an Autoregressive Integrated Moving Average (ARIMA) time series model to continuously monitor real-time performance data to prioritize servers of a plurality of servers (e.g., server farm), and dynamically modify a priority list based on continuous learning.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a power distribution management platform 110.

The user devices 102 can comprise, for example, Internet of Things (IoT) devices, desktop, laptop or tablet computers, mobile telephones, or other types of processing devices capable of communicating with the power distribution management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L, N and P are assumed to be arbitrary positive integers greater than or equal to two.

The terms "client" or "user" herein are intended to be broadly construed so as to encompass numerous arrangements of human, hardware, software or firmware entities, as well as combinations of such entities. Power distribution management services may be provided for users utilizing one or more machine learning models, although it is to be appreciated that other types of infrastructure arrangements could be used. At least a portion of the available services and functionalities provided by the power distribution management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the power distribution management platform 110, as well as to support communication between the power distribution management platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the power distribution management platform 110.

The information processing system 100 further includes at least one power distribution unit (PDU) 150, server groups 160-1 and 160-2 (collectively "server groups 160") and a plurality of power sources 170-1, 170-2, . . . 170-P (collectively "power sources 170") connected to the power distribution management platform 110 and/or to each other via the network 104 or other type of connection such as, for example, a wired connection. Although two server groups 160-1 and 160-2 are shown in FIG. 1, the embodiments are not necessarily limited thereto, and more or less than two server groups can be used. In addition, although the illustrative embodiments use servers as examples of hardware components, the embodiments are not necessarily limited thereto, and can apply to other types of hardware components, such as, but not necessarily limited to, storage arrays, routers, modems, networking equipment, etc.

The power sources 170 include, for example, main and generator distribution panels, uninterrupted power supply (UPS) units and/or AC power sources. One or more PDUs 150 are connected to the power sources 170. According to an embodiment, the PDU(s) 150 comprise a plurality of outputs designed to distribute electric power to the server groups 160 and/or to racks of servers, computers and networking equipment of the system 100.

The power distribution management platform 110 in the present embodiment is assumed to be accessible to the user devices 102 over the network 104. In addition, the power distribution management platform 110 can access the PDU 150, server groups 160 and power sources 170 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The power distribution management platform 110, on behalf of respective infrastructure tenants each corresponding to one or more users associated with respective ones of the user devices 102 provides a platform for automating the prioritization and management of power distribution to servers and other equipment during power outages and shortages.

Referring to FIG. 1, the power distribution management platform 110 comprises a component priority layer 120, a power distribution and optimization layer 130, and an emergency re-synchronization layer 140. The component priority layer 120 includes a data collection engine 121 and a component analysis engine 122. The power distribution and optimization layer 130 includes an available power computation engine 131, a power distribution engine 132 and a power optimization engine 133.

According to one or more embodiments, the component priority layer 120 uses machine learning techniques to analyze system components (e.g., a plurality of servers across a datacenter) to prioritize them in an order of importance from most important to least important. More specifically, referring to FIGS. 1 and 4, a data collection engine 121/421 (also referred to herein as a "data collector") collects performance data from system hardware components, such as, for example, servers of the server groups 160. The performance data includes, but it is not necessarily limited to, hardware capacity and availability data 423 comprising, for example, memory usage and available free memory of the system hardware components, application/task data 425 comprising applications and/or tasks running on the system hardware components, system health data 427 available from system log data, and system utilization data 429 comprising, for example, system traffic data and system load data.

In more detail, the application/task data 425 comprises, for example, data corresponding to installed applications on a server or other processing device, including data identifying all of the services and tasks which are running in the system components and data identifying created datasets in the system components. According to an embodiment, applications are identified based on task. Higher priority is assigned to components running more applications, services and tasks, and having more datasets than other components. Alternatively, or as an additional factor for determining priority based on application/task, a user, such as an administrator (via one or more user devices 102) may input a pre-defined application priority list to the power distribution management platform 110 specifying the priority of certain applications or services over other applications or services based on, for example, need. Servers or other hardware components running the higher priority applications, tasks and/or services are given higher priority than servers or other components not running the higher priority applications, tasks and/or services.

System health data 427 comprises, for example, host operating system (OS) and device management logs which are analyzed to determine the current health of a system or individual components of the system. System health data includes data on whether there have been any critical hardware failures, and/or any indications in collected logs whether components have been or are in critical states. In accordance with an embodiment, higher priority is assigned to components reflecting better health than other components.

System utilization data 429 comprises, for example, data identifying incoming and outgoing input-output (IO) operation network or central processing unit (CPU) processing traffic that the system and/or individual components such as, for example, servers are handling. The system utilization data 429 includes utilization data of individual components, such as servers. In accordance with an embodiment, higher priority is assigned to components reflecting higher traffic and load than other components. Higher priority is also assigned to components reflecting higher memory usage and less available free memory than other components.

The metrics for determining priority discussed herein above are used as input by the component analysis engine 122 when applying the machine learning techniques to generate a priority list of hardware components for the receipt of power during a power crisis. Given a limited supply of power during a power crisis, power is distributed to hardware components higher on the priority list before other components ranked lower on the priority list.

According to one or more embodiments, the data collected by the data collection engine 121/421 comprises real-time datasets reflecting performance data concurrent with or nearly concurrent with its collection. The data collection engine 121/421 may continuously monitor system hardware components to continuously retrieve and update performance statistics from the system hardware components.

FIG. 5 depicts example pseudocode 500 for collecting performance data according to an illustrative embodiment, and FIG. 6 depicts an example data report 600 of collected performance data corresponding to services and/or applications running on computers in a datacenter in an illustrative embodiment. Referring to FIG. 5, the pseudocode 500 includes commands for retrieving task lists, computer names, process names and process priority. The example data report 600 specifies computer name, image name, process identifier (PID), session number, memory usage, status, user name and CPU time. The PID comprises a unique number identifying a running process in an OS.

The component analysis engine 122 uses machine learning techniques to analyze the performance data and generates the priority list of hardware components (e.g., servers) based on the analysis. Referring to the operational flow 700 in FIG. 7, data from the data collector 721 including, for example, real-time performance data 780 is applied to one or more time series models, such as, for example, Autoregressive Integrated Moving Average (ARIMA) models 724, to yield a real-time system priority list 782 of the hardware components. The performance data 780 includes, for example, hardware capacity and availability data 723 of the hardware components, application/task data 725 of the hardware components, system health data 727 including health data of the hardware components, and system utilization data 729, which is the same or similar to the hardware capacity and availability data 423, application/task data 425, health data 427, and utilization data 429 of the hardware components as discussed in connection with the operational flow 400 of FIG. 4. The real-time utilization data 729 comprises, for example, central processing unit (CPU) utilization, memory utilization, network utilization and storage utilization of the plurality of hardware components.

Figure 7:
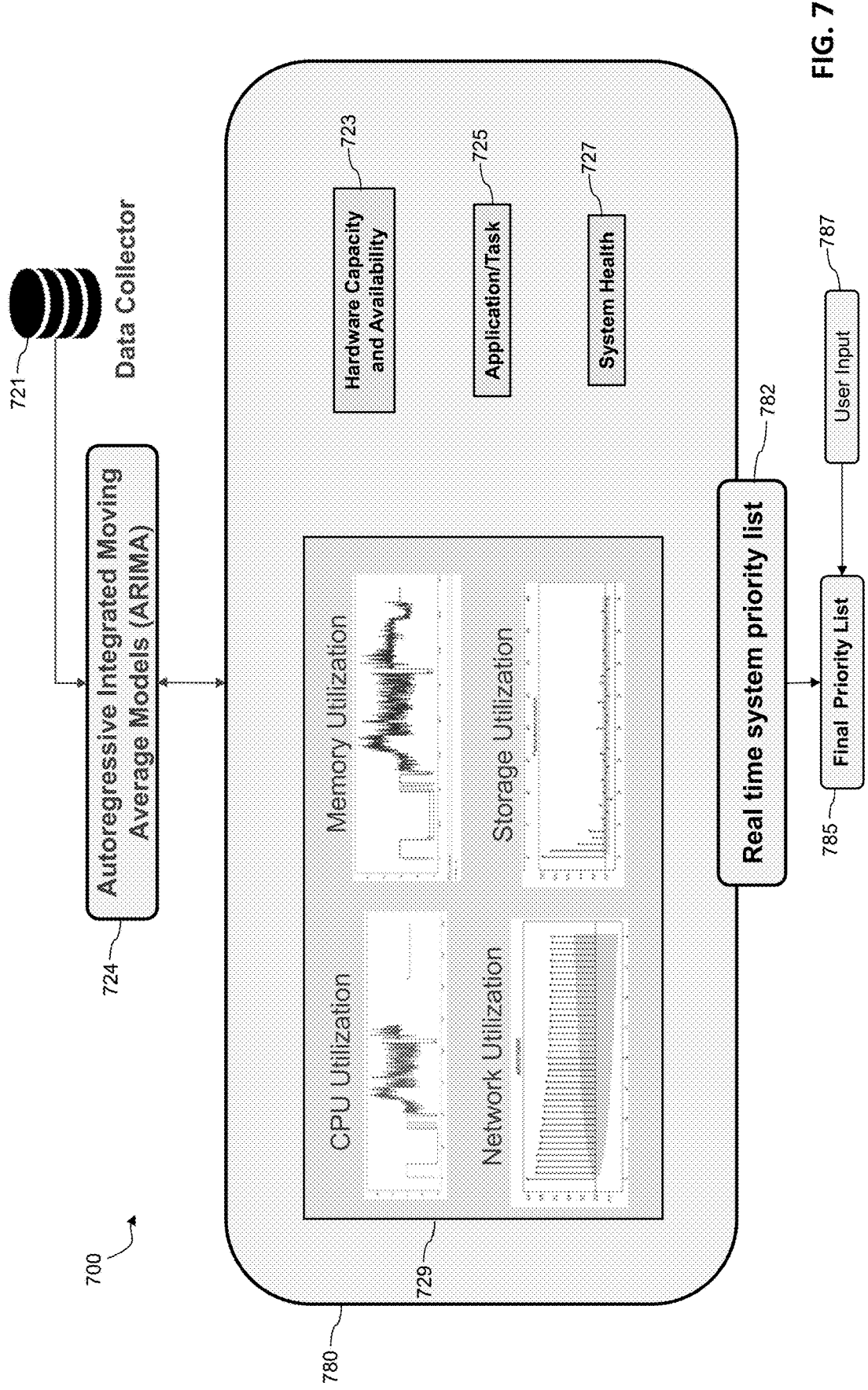
FIG. 7 depicts details of a machine learning algorithm for determining server priority in an illustrative embodiment.

As shown in FIG. 7, the real-time performance data 780 is analyzed using the ARIMA models 724 to determine real-time performance states of the plurality of hardware components and the priority metrics are applied to the real-time performance data in order to generate the real-time system priority list 782 of the hardware components (e.g. servers). According to an embodiment, a user (e.g., an administrator via one of the user devices 102) can provide user input 787 to modify the priority list 782 or determine to use the priority list 782 as generated. A final priority list 785 incorporating user input 787 is input to and applied by the power distribution and optimization layer 130.

The data collector 721 continuously monitors and collects the performance data 780, which is applied to a time series model, such as the ARIMA model, to analyze the data to generate the real-time system priority list 782. The real-time system priority list 782 can be dynamically generated and modified by continuously learning.

Referring to FIG. 3, an example server priority table 300 comprises a priority list of a plurality of servers listed in descending order of priority, along with a service tag for each server. One or more applications/services that each server is providing, and percentages of CPU, memory and power utilization are also listed for each server in the list.

As described herein, the component analysis engine 122 uses one or more machine learning techniques to analyze input data and datasets provided by data collection engine 121 and generates a server priority list for a datacenter or other system. The server priority list includes categories based on the priorities, such as those shown in the table 300. However, other categories relevant to server priority may also be used. As noted above, an administrator may have an option to edit and modify the priority list. When the power distribution management platform 110 detects a power crisis or an administrator provides an input to the power distribution management platform 110 that a power crisis is occurring, the power distribution management platform 110 distributes available power to servers or other equipment based on the priority list.

Figure 2:
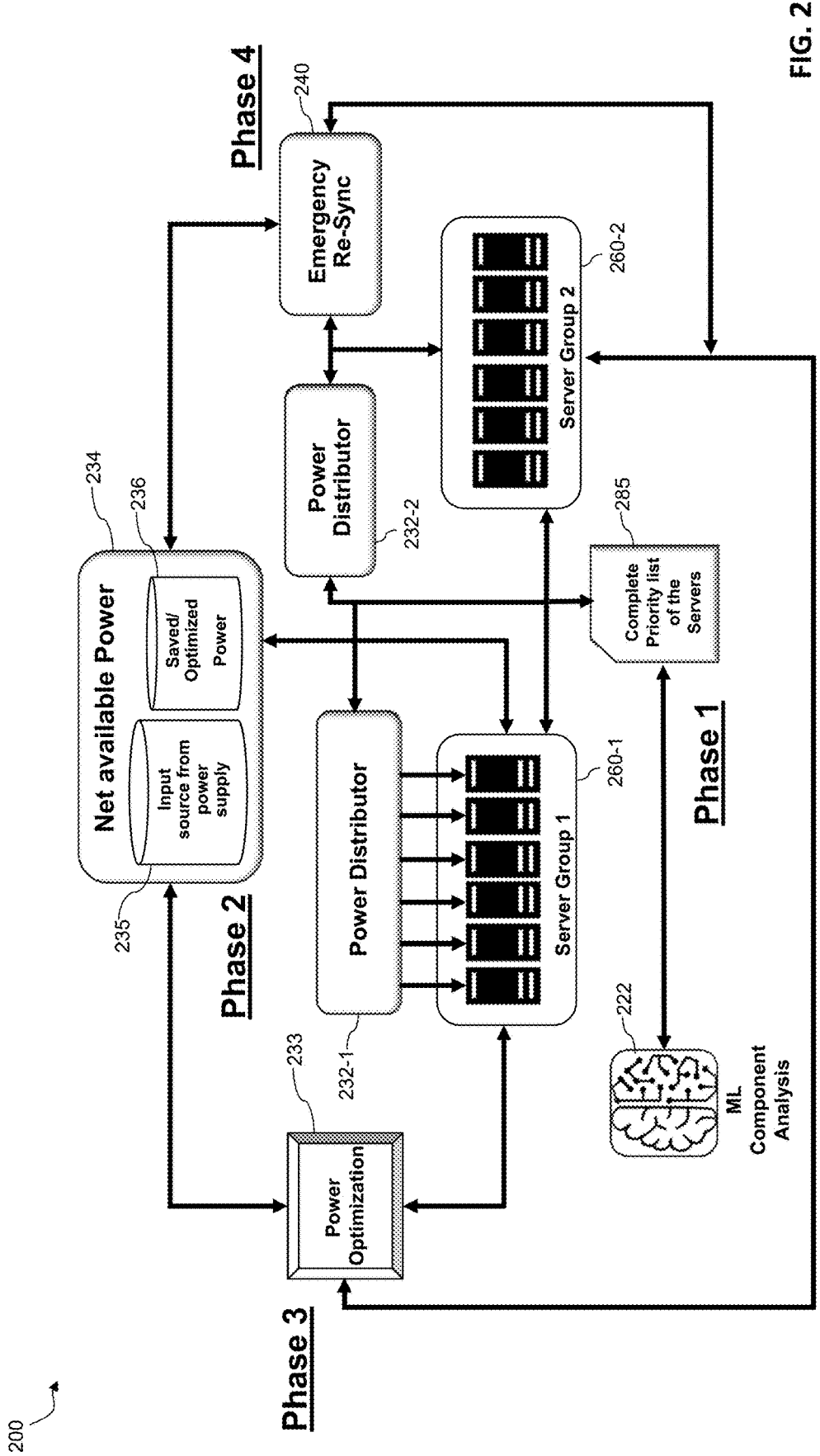
FIG. 2 depicts details of an operational flow for prioritizing and managing power distribution according to an illustrative embodiment.

Referring to the operational flow 200 in FIG. 2, in what is referred to as "Phase 1," machine learning is used to perform component analysis 222 to generate a priority list 285. As described herein, machine learning techniques prioritize the servers by, for example, analyzing applications installed on the servers, current system health information and/or system load and/or traffic including, for example, utilization percentages to generate the server priority list 285. Similarly, FIG. 4 illustrates data processing to provide input data and datasets from the data collector 421 so that machine learning can be used to perform component analysis 422 to generate a priority list ("set priority").

Figure 4:
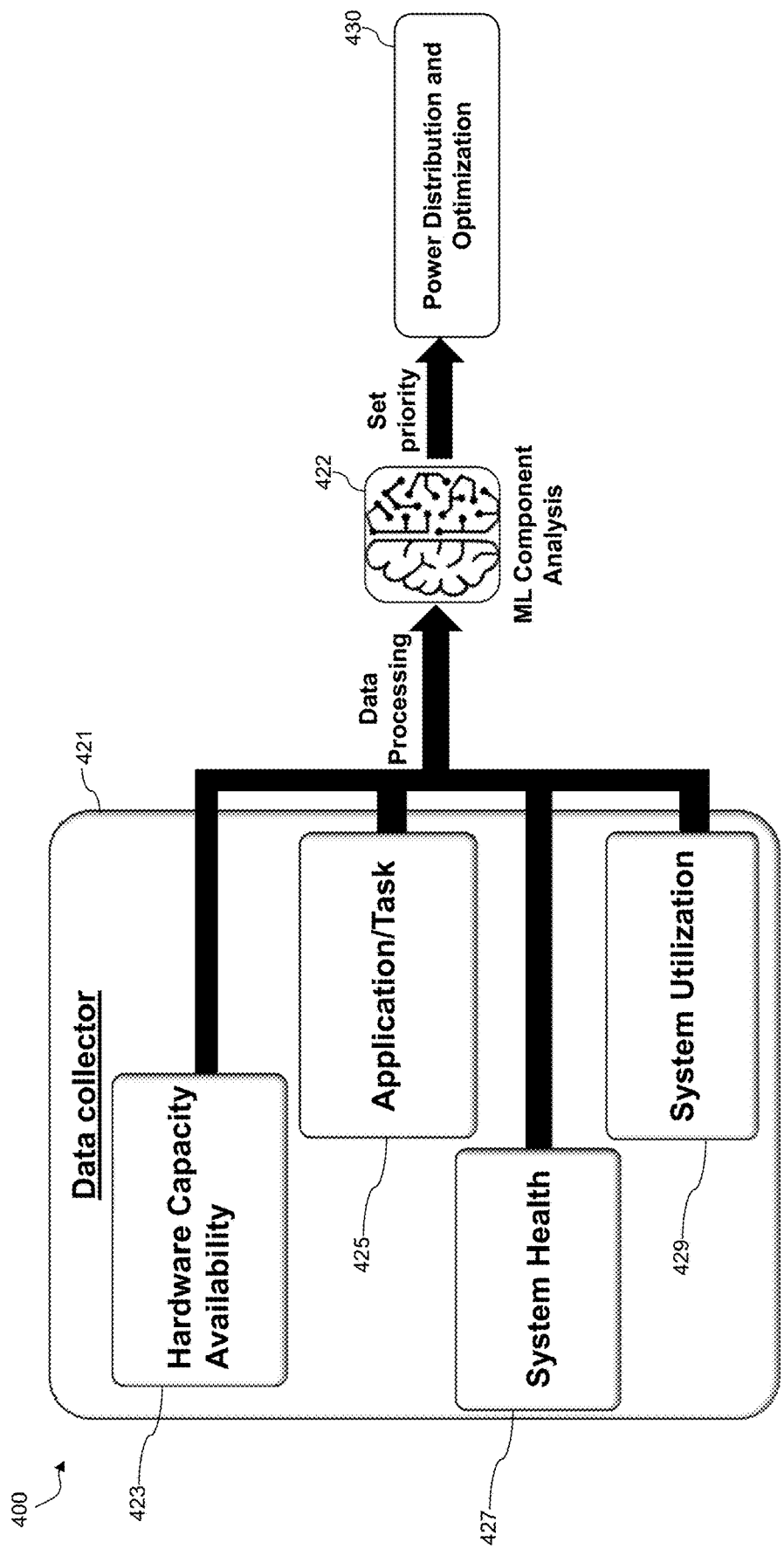
FIG. 4 depicts an operational flow for determining server priority according to an illustrative embodiment.

Referring to FIGS. 1 and 4, the priority list is provided to the power distribution and optimization layer 130/430. In the event of a power crisis caused by, for example, accidents, power equipment breakdowns or natural disasters, the available power computation engine 131 computes available power from the power sources 170, and the power distribution engine 132 distributes the available power to one or more of the plurality of hardware components (e.g., servers in the server groups 160) based on the priority list. Power is distributed to the servers or other equipment according to the priorities set forth in the priority list.

The power optimization engine 133 identifies hardware components that are without power following the distribution of the available power by the power distribution engine 132 and, in response to the identifying, controls power usage of the hardware components already receiving power to reduce their power consumption. The controlling of the power usage comprises, for example, reducing fan speeds, changing a thermal profile, and dynamically capping the power usage of the hardware components already receiving power. The power saved by the reduced power consumption is distributed to one or more of the hardware components previously identified to be without power according to their positions on the priority list.

Accordingly, following initial power distribution to the higher priority components, if there are components still left without any power, the power optimization engine 133 will implement mechanisms for reducing the power usage of the components currently receiving power, so that lower priority components, to the extent possible, can also receive power.

For example, referring to "Phase 2" in FIG. 2, the available power 235 from the power sources 170 that are still able to provide power following a power limiting event is provided to server group 1 260-1, which in this example, represents servers that are higher on the priority list 285 than those servers in server group 2 260-2. Using the power distributor 232-1, which is the same as or an element of the power distribution engine 132 in FIG. 1, the available power 235 is distributed to the servers in server group 1 260-1 according to the priority list 285. In this example, it is assumed that the servers in server group 2 260-2 remain without power following the distribution of the available power 235.

Referring to "Phase 3" in FIG. 2, the power optimization engine 233, which is the same or similar to the power optimization engine 133 in FIG. 1, identifies that the servers in server group 2 260-2 are still without power following the distribution of the available power 235 to server group 1 260-1. In response, the power optimization engine 233 controls power usage of servers in server group 1 260-1 by reducing their power consumption. The power optimization engine 233 transmits instructions to the servers in server group 1 260-1 to, for example, reduce their fan speeds, change their thermal profile, and dynamically cap their power usage at a particular threshold, which can be a pre-specified amount or dynamically calculated for each server based on the available power and/or the applications, tasks and/or services currently running on each server in server group 1 260-1.

In connection with reducing the fan speed, fan optimization can be configured by a user using, for example, a graphical user interface (GUI), such as an Integrated Dell® Remote Access Controller (iDRAC) GUI and/or a command line utility, such as a Remote Access Controller Admin (RACADM) utility. RACADM is a command line utility used for managing servers via the iDRAC. An example command for controlling fan speed is "racadm set system-.thermalsettings.MinimumFanSpeed 45." Similarly, an example command for controlling a thermal profile is "racadm set system.thermalsettings.ThermalProfile 1."

Thermal and fan profile optimization can be performed at runtime. For example, the power optimization engine 233 transmits instructions including the above commands to the servers in server group 1 260-1 to reduce their fan speed and change the thermal profile when the servers in server group 2 260-2 are still without power following the distribution of the available power 235 to server group 1 260-1. The instructions can be transmitted using an available application programming interface (API), such as, for example a Redfish® API.

According to an embodiment, in order to optimize a thermal profile during a power crisis, the power optimization engine 133/233 configures a low power consumption thermal profile for one or more servers which could save some power. However, when a low power consumption thermal profile is implemented, a server may experience an increase in temperature due to cooling components not operating or not operating at full capacity. If the server heats up to a temperature exceeding a particular threshold, the power optimization engine 133/233 restores the thermal profile to a normal power consumption mode in order to reduce the system temperature back to a normal level. In one or more embodiments, the power optimization engine 133/233 is programmed with warning and/or critical temperature thresholds that when exceeded trigger a return to normal power consumption.

According to an embodiment, the power optimization engine 133/233 dynamically changes power capping values according to a configuration of the thermal profile. For example, when a low power consumption thermal profile has been configured in a server, the power optimization engine 133/233 implements a minimum recommended power for the server. Based on the installed hardware, a server may recommend the minimum required power to operate. The recommended minimum power is used by the power optimization engine 133/233 as a reference when dynamically changing the power capping.

The power saved by the reduced power consumption (saved/optimized power 236) is distributed via power distributor 232-2, which is the same as or an element of the power distribution engine 132 in FIG. 1, to the servers in server group 260-2 according to their positions on the priority list 285. The available power 235 from the power sources 170 that are still able to provide power, and the saved/optimized power 236 comprise the net available power 234.

Figure 8:
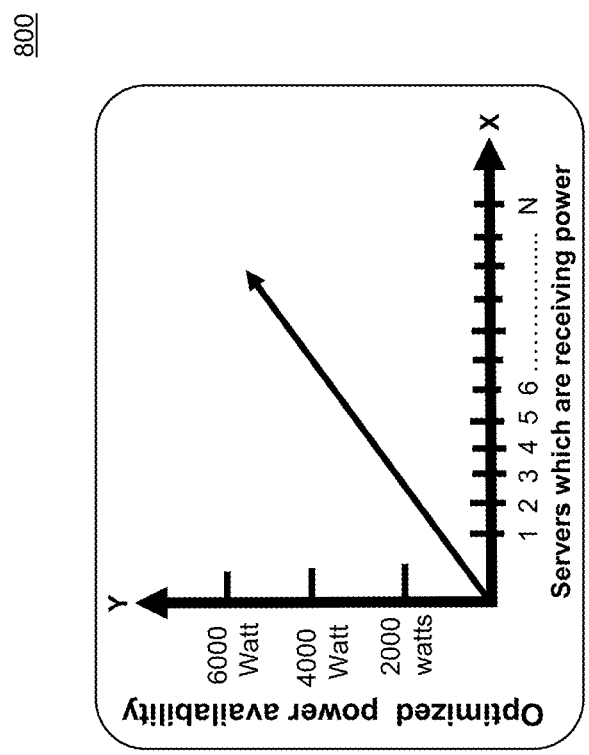
FIG. 8 depicts a graph showing distribution of power to servers as the availability of optimized power increases in an illustrative embodiment.

The graph 800 in FIG. 8 illustrates distribution of power to servers as the availability of optimized power increases. For example, as the power optimization engine 133/233 controls the power usage of servers already receiving power reducing their power consumption, the availability of optimized power (y-axis) increases. As the availability of optimized power increases, the number of servers which are receiving power (x-axis) also increases. For example, the number of servers receiving power increases when the servers in server group 2 260-2 are also receiving power.

Referring to FIGS. 1 and 2, the power optimization engine 133/233 monitors power consumption of the servers in the server groups 160/260. According to an embodiment, the power optimization engine 133/233 identifies an increase in the power consumption by the top or higher priority servers (e.g., servers in server group 1 260-1). The available power computation engine 131 calculates a decrease in net available power 234 as a result of the increase in the power consumption by the top or higher priority servers. In response, referring to "Phase 4" in FIG. 2, the emergency re-synchronization layer 140/240 begins to power off servers from the bottom of the priority list 285 (e.g., one or more of the servers in server group 2 260-2) to compensate for the increased power consumption by the top or higher priority servers.

According to one or more embodiments, any databases used by the power distribution management platform 110 to store, for example, data collected by the data collection engine 121, component analysis results, available power data, priority lists, the results of the machine learning analysis or other data can be configured according to a relational database management system (RDBMS) (e.g., PostgreSQL). Databases in some embodiments are implemented using one or more storage systems or devices associated with the power distribution management platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the power distribution management platform 110, the component priority layer 120, power distribution and optimization layer 130 and/or emergency re-synchronization layer 140 in other embodiments can be implemented at least in part externally to the power distribution management platform 110, for example, as stand-alone servers, sets of servers or other types of systems coupled to the network 104. For example, the component priority layer 120, power distribution and optimization layer 130 and/or emergency re-synchronization layer 140 may be provided as cloud services accessible by the power distribution management platform 110.

The component priority layer 120, power distribution and optimization layer 130 and/or emergency re-synchronization layer 140 in the FIG. 1 embodiment are each assumed to be implemented using at least one processing device. Each such processing device generally comprises at least one processor and an associated memory, and implements one or more functional modules for controlling certain features of the component priority layer 120, power distribution and optimization layer 130 and/or emergency re-synchronization layer 140.

At least portions of the power distribution management platform 110 and the components thereof may be implemented at least in part in the form of software that is stored in memory and executed by a processor. The power distribution management platform 110 and the components thereof comprise further hardware and software required for running the power distribution management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the component priority layer 120, power distribution and optimization layer 130, emergency re-synchronization layer 140 and other components of the power distribution management platform 110 in the present embodiment are shown as part of the power distribution management platform 110, at least a portion of the component priority layer 120, power distribution and optimization layer 130, emergency re-synchronization layer 140 and other components of the power distribution management platform 110 in other embodiments may be implemented on one or more other processing platforms that are accessible to the power distribution management platform 110 over one or more networks. Such components can each be implemented at least in part within another system element or at least in part utilizing one or more stand-alone components coupled to the network 104.

It is assumed that the power distribution management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the component priority layer 120, power distribution and optimization layer 130, emergency re-synchronization layer 140 and other components of the power distribution management platform 110, and the elements thereof can each be implemented in the form of one or more LXCs running on one or more VMs. Other arrangements of one or more processing devices of a processing platform can be used to implement the component priority layer 120, power distribution and optimization layer 130 and emergency re-synchronization layer 140, as well as other components of the power distribution management platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the power distribution management platform 110 to reside in different data centers. Numerous other distributed implementations of the power distribution management platform 110 are possible.

Accordingly, one or each of the component priority layer 120, power distribution and optimization layer 130, emergency re-synchronization layer 140 and other components of the power distribution management platform 110 can each be implemented in a distributed manner so as to comprise a plurality of distributed components implemented on respective ones of a plurality of compute nodes of the power distribution management platform 110.

It is to be appreciated that these and other features of illustrative embodiments are presented by way of example only, and should not be construed as limiting in any way.

Accordingly, different numbers, types and arrangements of system components such as the component priority layer 120, power distribution and optimization layer 130, emergency re-synchronization layer 140 and other components of the power distribution management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the power distribution management platform can be offered to cloud infrastructure customers or other users as part of FaaS, CaaS and/or PaaS offerings.

Figure 9:
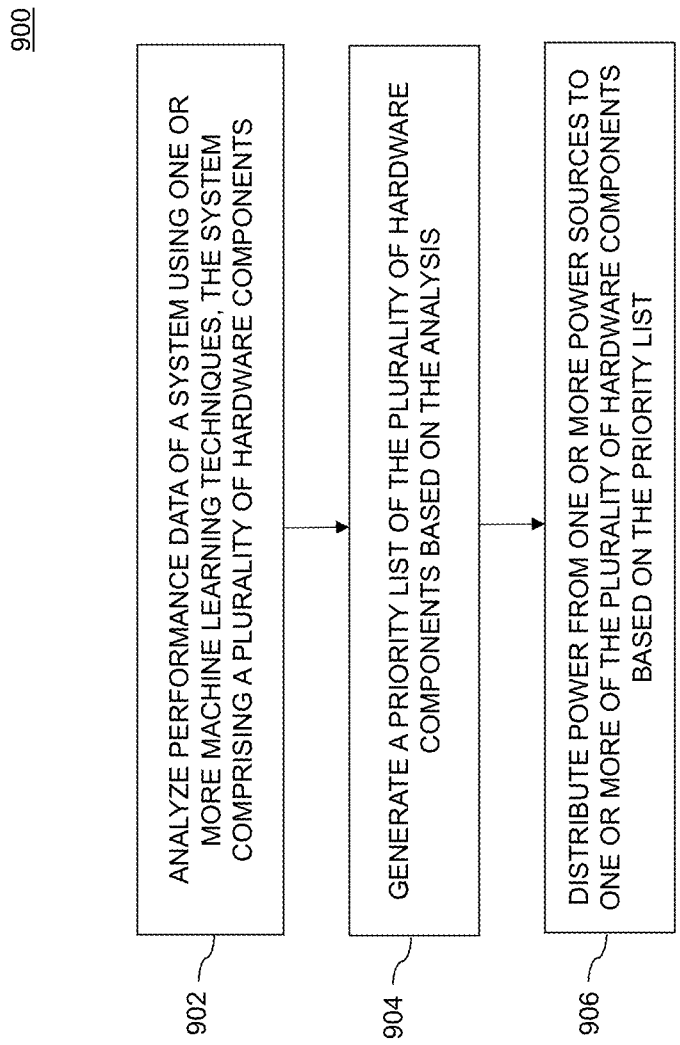
FIG. 9 depicts a process for prioritizing and managing power distribution according to an illustrative embodiment.

The operation of the information processing system 100 will now be described in further detail with reference to the flow diagram of FIG. 9. With reference to FIG. 9, a process 900 for prioritizing and managing power distribution as shown includes steps 902 through 906, and is suitable for use in the system 100 but is more generally applicable to other types of information processing systems comprising a power distribution management platform configured for prioritizing and managing power distribution.

In step 902, performance data of a system is analyzed using one or more machine learning techniques. The system comprises a plurality of hardware components, such as, for example, servers. The performance data comprises, for example, memory usage of the plurality of hardware components, applications, tasks and/or services running on the plurality of hardware components, system log data, system traffic data and/or system load data.

In step 904, a priority list of the plurality of hardware components is generated based on the analysis, and in step 906, the power from one or more power sources is distributed to one or more of the plurality of hardware components based on the priority list. The distributing of the power based on the priority list is performed in response to the identifying a power crisis.

A time series model, such as, for example, an ARIMA model can be used to determine real-time performance states of the plurality of hardware components. The time series model analyzes, for example: (i) one or more of capacity data and availability data of the plurality of hardware components; (ii) one or more of applications, tasks and services running on the plurality of hardware components; (iii) health data of the plurality of hardware components; and/or (iv) utilization data of the plurality of hardware components to determine the real-time performance states of the plurality of hardware components.

According to an embodiment, the process may comprise identifying at least one of the plurality of hardware components that are without power following the distributing of the power from the one or more power sources, and controlling power usage of the one or more of the plurality of hardware components to reduce power consumption of the one or more of the plurality of hardware components responsive to the identifying. The power saved by the reduced power consumption is distributed to the at least one of the plurality of hardware components without power. Controlling power usage may be accomplished by reducing a fan speed of the one or more of the plurality of hardware components, changing a thermal profile of the one or more of the plurality of hardware components and/or dynamically capping the power usage of the one or more of the plurality of hardware components.

The process may also include monitoring power consumption of the plurality of hardware components, identifying an increase in the power consumption by at least one of the plurality of hardware components, and powering off another one of the plurality of hardware components having a lower priority on the priority list than a priority of the at least one of the plurality of hardware components.

It is to be appreciated that the FIG. 9 process and other features and functionality described above can be adapted for use with other types of information systems configured to execute power distribution management services in a power distribution management platform or other type of platform.

The particular processing operations and other system functionality described in conjunction with the flow diagram of FIG. 9 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 9 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a power distribution management platform as disclosed herein can provide a number of significant advantages relative to conventional arrangements. For example, unlike conventional techniques, the embodiments advantageously use machine learning techniques to automate prioritization and management of power distribution to servers and other equipment during power outages. The embodiments provide functionality for ascertaining component priority based on real-time performance data and distributing power to components based on the determined priority during a loss of or decrease in power supply. Current approaches require administrators to manually identifying essential/priority servers in response to a power crisis.

Advantageously, the embodiments use time series techniques to automatically prioritize components by analyzing installed applications, load, traffic and health information of system components. In addition, the embodiments automatically control power consumption of system components based on the determined priority and provide mechanisms for reducing power consumption and optimizing available power.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the power distribution management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a power distribution management platform in illustrative embodiments. These and other cloud-based systems in illustrative embodiments can include object stores.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
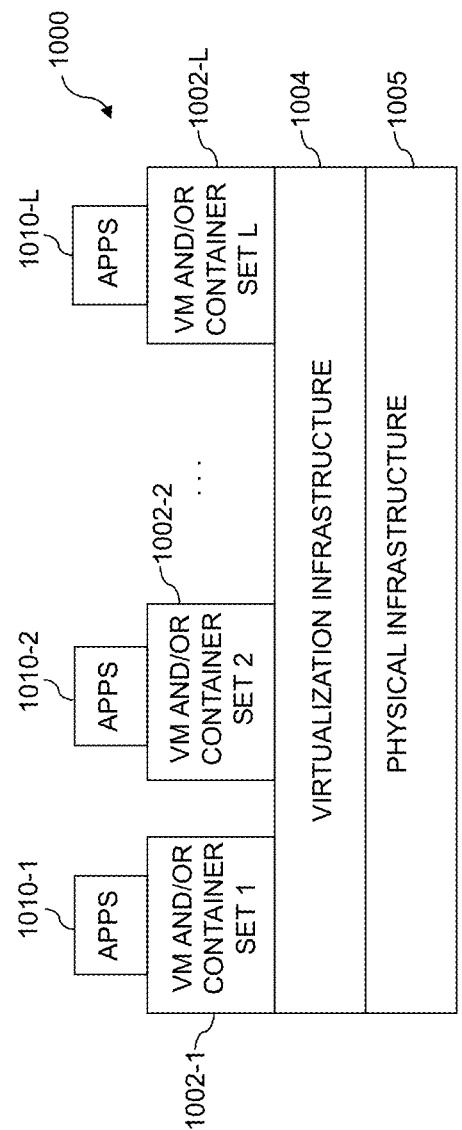
FIGS. 10 and 11 show examples of processing platforms that may be utilized to implement at least a portion of an information processing system in illustrative embodiments.
Figure 11:
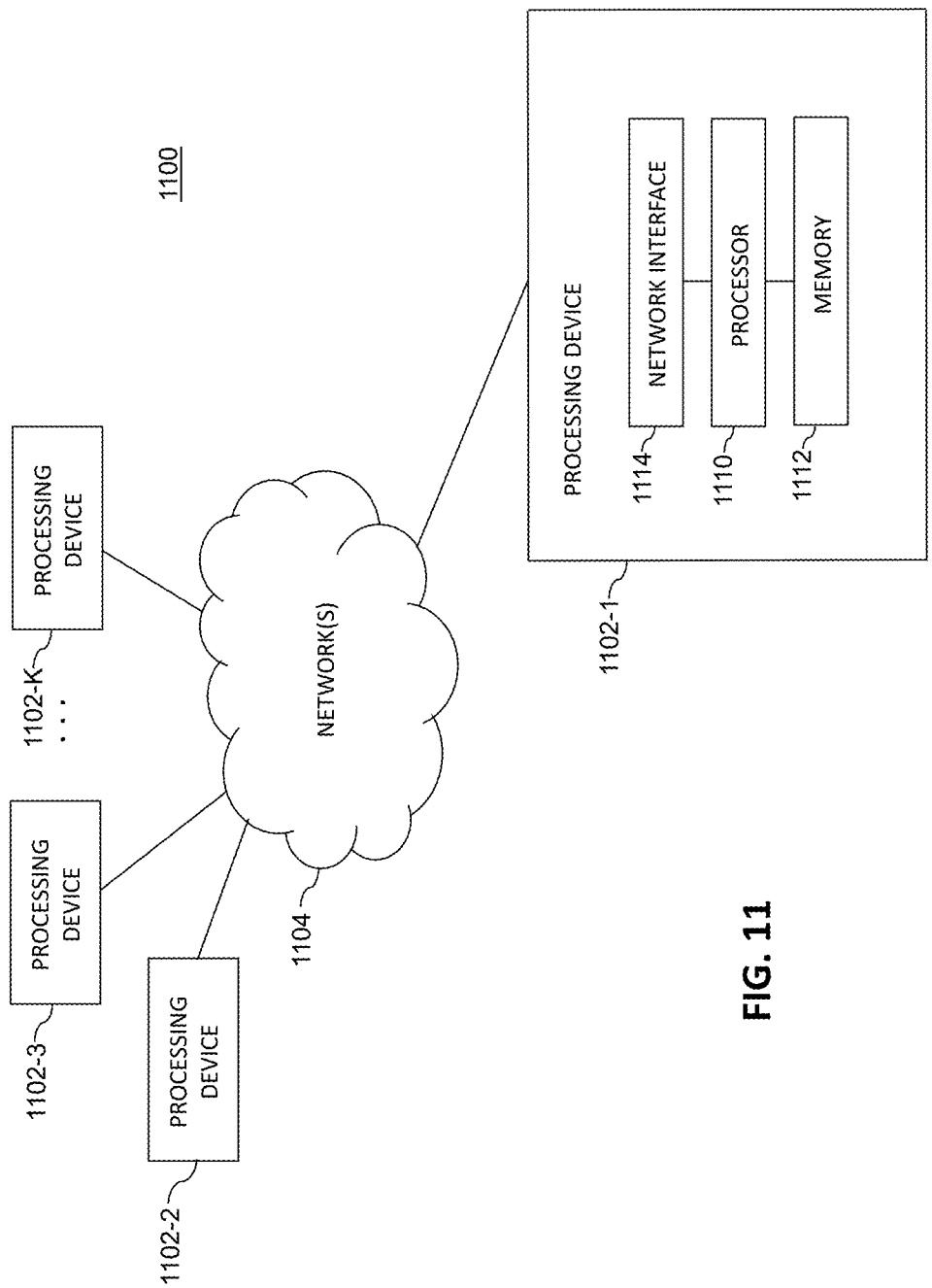

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . .

1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112. The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the power distribution management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and power distribution management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
analyzing performance data of a system using one or more machine learning techniques, the system comprising a plurality of hardware components, wherein the analyzing comprises using the one or more machine learning techniques to analyze health data of the plurality of hardware components to determine relative health levels of the plurality of hardware components;
generating a priority list of the plurality of hardware components based on the analysis, wherein higher relative health levels comprise at least one factor for assigning higher priority to respective ones of the plurality of hardware components on the priority list;

distributing power from one or more power sources to a first hardware component subset comprising one or more of the plurality of hardware components, wherein the distributing is based on the priority list;

identifying a second hardware component subset comprising at least one of the plurality of hardware components that are without power following the distributing of the power from the one or more power sources to the first hardware component subset; and controlling power usage of the one or more of the plurality of hardware components of the first hardware component subset responsive to the identifying;

wherein the steps of the method are executed by a processing device operatively coupled to a memory.

2. The method of claim 1, further comprising computing available power from the one or more of the power sources.

3. The method of claim 1, wherein the performance data comprises at least one of memory usage of the plurality of hardware components, one or more of applications, tasks and services running on the plurality of hardware components, system log data, system traffic data and system load data.

4. The method of claim 1, wherein the one or more machine learning techniques comprises a time series model, and wherein the analyzing comprises using the time series model to analyze at least one of: (i) one or more of capacity data and availability data of the plurality of hardware components; (ii) one or more of applications, tasks and services running on the plurality of hardware components; and (iii) utilization data of the plurality of hardware components to determine real-time performance states of the plurality of hardware components.

5. The method of claim 4, wherein the time series model comprises an Autoregressive Integrated Moving Average (ARIMA) model.

6. The method of claim 4, wherein the utilization data comprises at least one of central processing unit (CPU) utilization, memory utilization, network utilization and storage utilization of the plurality of hardware components.

7. The method of claim 1, wherein the plurality of hardware components comprise a plurality of servers.

8. The method of claim 1, wherein the controlling of the power usage comprises reducing power consumption of the one or more of the plurality of hardware components of the first hardware component subset.

9. The method of claim 8, further comprising distributing power saved by the reduced power consumption to the at least one of the plurality of hardware components without power.

10. The method of claim 8, wherein the controlling of the power usage comprises at least one of reducing a fan speed of the one or more of the plurality of hardware components of the first hardware component subset, changing a thermal profile of the one or more of the plurality of hardware components of the first hardware component subset, and dynamically capping the power usage of the one or more of the plurality of hardware components of the first hardware component subset.

11. The method of claim 1, further comprising:
monitoring power consumption of the plurality of hardware components;
identifying an increase in the power consumption by at least a first one of the plurality of hardware components; and
powering off at least a second one of the plurality of hardware components having a lower priority on the priority list than a priority of at least the first one of the plurality of hardware components.

12. The method of claim 1, further comprising identifying a power crisis in the system, wherein the distributing of the power based on the priority list is performed in response to the identifying of the power crisis.

13. An apparatus comprising:
a processing device operatively coupled to a memory and configured to:
analyze performance data of a system using one or more machine learning techniques, the system comprising a plurality of hardware components;
wherein, in analyzing the performance data, the processing device is configured to use the one or more machine learning techniques to analyze health data of the plurality of hardware components to determine relative health levels of the plurality of hardware components;
generate a priority list of the plurality of hardware components based on the analysis, wherein higher relative health levels comprise at least one factor for assigning higher priority to respective ones of the plurality of hardware components on the priority list;
distribute power from one or more power sources to a first hardware component subset comprising one or more of the plurality of hardware components, wherein the distributing is based on the priority list;
identify a second hardware component subset comprising at least one of the plurality of hardware components that are without power following the distributing of the power from the one or more power sources to the first hardware component subset; and
control power usage of the one or more of the plurality of hardware components of the first hardware component subset responsive to the identifying.

14. The apparatus of claim 13, wherein, in controlling the power usage, the processing device is configured to:
reduce power consumption of the one or more of the plurality of hardware components of the first hardware component subset.

15. The apparatus of claim 14, wherein the processing device is further configured to distribute power saved by the reduced power consumption to the at least one of the plurality of hardware components without power.

16. The apparatus of claim 13, wherein the processing device is further configured to:
monitor power consumption of the plurality of hardware components;
identify an increase in the power consumption by at least a first one of the plurality of hardware components; and
power off at least a second one of the plurality of hardware components having a lower priority on the priority list than a priority of at least the first one of the plurality of hardware components.

17. An article of manufacture comprising a non-transitory processor-readable storage medium having stored therein program code of one or more software programs, wherein the program code when executed by at least one processing device causes said at least one processing device to perform the steps of:
analyzing performance data of a system using one or more machine learning techniques, the system comprising a plurality of hardware components;
wherein, in analyzing the performance data, the program code causes said at least one processing device to use the one or more machine learning techniques to analyze health data of the plurality of hardware components to determine relative health levels of the plurality of hardware components;

generating a priority list of the plurality of hardware components based on the analysis wherein higher relative health levels comprise at least one factor for assigning higher priority to respective ones of the plurality of hardware components on the priority list;

distributing power from one or more power sources to a first hardware component subset comprising one or more of the plurality of hardware components, wherein the distributing is based on the priority list;

identifying a second hardware component subset comprising at least one of the plurality of hardware components that are without power following the distributing of the power from the one or more power sources to the first hardware component subset; and controlling power usage of the one or more of the plurality of hardware components of the first hardware component subset responsive to the identifying.

18. The article of manufacture of claim 17, wherein, in controlling the power usage, the program code causes said at least one processing device to perform the step of:

reducing power consumption of the one or more of the plurality of hardware components of the first hardware component subset.

19. The article of manufacture of claim 18, wherein the program code further causes said at least one processing device to perform the step of distributing power saved by the reduced power consumption to the at least one of the plurality of hardware components without power.

20. The article of manufacture of claim 17, wherein the program code further causes said at least one processing device to perform the steps of:

monitoring power consumption of the plurality of hardware components;

identifying an increase in the power consumption by at least a first one of the plurality of hardware components; and powering off at least a second one of the plurality of hardware components having a lower priority on the priority list than a priority of at least the first one of the plurality of hardware components.

* * * * *